(12) United States Patent
Nelson

(10) Patent No.: US 9,113,614 B1
(45) Date of Patent: Aug. 25, 2015

(54) SELECTIVE BIRD FEEDING APPARATUS

(71) Applicant: Robert Nelson, Sioux Falls, SD (US)

(72) Inventor: Robert Nelson, Sioux Falls, SD (US)

(*) Notice: Subject to any disclaimer, the term of this patent is extended or adjusted under 35 U.S.C. 154(b) by 67 days.

(21) Appl. No.: 14/171,818

(22) Filed: Feb. 4, 2014

(51) Int. Cl.
*A01K 39/00* (2006.01)
*A01K 39/01* (2006.01)

(52) U.S. Cl.
CPC ..................... *A01K 39/01* (2013.01)

(58) Field of Classification Search
USPC .......... 119/51.01, 51.02, 57.8, 57.9, 840–842
See application file for complete search history.

(56) References Cited

U.S. PATENT DOCUMENTS

| | | | |
|---|---|---|---|
| 2,965,070 A | 12/1960 | Myrick | |
| 3,241,525 A | 3/1966 | Meier | |
| 3,399,650 A | 9/1968 | Goodman | |
| 3,927,645 A | 12/1975 | Varner | |
| 4,541,362 A | 9/1985 | Dehls | |
| 4,644,903 A * | 2/1987 | Shaver | 119/51.01 |
| 4,977,859 A | 12/1990 | Kilham | |
| D320,875 S | 10/1991 | Kilham | |
| 5,445,109 A | 8/1995 | Gray et al. | |
| 5,471,951 A | 12/1995 | Collins | |
| 6,062,167 A * | 5/2000 | Soley | 119/57.8 |
| 2,373,703 A1 | 10/2002 | Nock | |
| 6,951,188 B1 | 10/2005 | Lush | |
| 7,237,507 B1 | 7/2007 | Colwell | |
| 7,395,782 B1 * | 7/2008 | Lindsay | 119/51.02 |
| 7,418,923 B1 | 9/2008 | Banyas et al. | |
| 7,458,336 B2 * | 12/2008 | Eu | 119/51.02 |
| 7,503,281 B2 * | 3/2009 | Van Den Berg et al. | 119/51.02 |
| 8,733,285 B2 * | 5/2014 | Taber | 119/57.8 |
| 2008/0035065 A1 | 2/2008 | Towner | |
| 2010/0300364 A1 * | 12/2010 | Sena et al. | 119/51.01 |

* cited by examiner

*Primary Examiner* — Richard Price, Jr.

(57) ABSTRACT

A selective bird feeding apparatus includes a housing having an access opening and door mounted positionable in a closed condition or in an open condition relative to the access opening. A drive mechanism is actuated to move the door to the closed condition or to the open condition. An actuator coupled to the drive mechanism includes a sensor which radiates energy to a position adjacent to the opening. The sensor receives reflected radiation reflected off of an object adjacent to the opening. A control circuit assigns an input value to the reflected radiation which is compared with a stored standard value. The actuator actuates the drive mechanism to move the door to the closed condition when the input value is outside a threshold limit of the standard value and actuates the drive mechanism to move the door to the open condition when the input value is within the threshold limit.

26 Claims, 7 Drawing Sheets

SELECTIVE BIRD FEEDING APPARATUS

BACKGROUND OF THE DISCLOSURE

Field of the Disclosure

The disclosure relates to electronic bird feeding devices and more particularly pertains to a new electronic bird feeding device for detecting the species of a bird to provide bird feed to a desired bird species and restricting bird feed to an undesired species.

SUMMARY OF THE DISCLOSURE

An embodiment of the disclosure meets the needs presented above by generally comprising a housing having an access opening therein for permitting access to bird feed in an interior of the housing by a bird. A door is mounted to the housing and is positionable in a closed condition closing the access opening or in an open condition exposing the bird feed. A drive mechanism is mounted to the housing and is mechanically coupled to the door. The drive mechanism is actuated to move the door to the closed condition or to the open condition. An actuator is mounted on the housing and is operationally coupled to the drive mechanism. A sensor is mounted to the housing and is operationally coupled to the actuator. The sensor measures an area outside of the housing and adjacent to the opening. The sensor is configured to electronically determine when an undesirable bird species is adjacent to the opening. The actuator actuates the door to the closed condition when an undesirable bird species is detected by the sensor. The sensor detects one or more species indicators. The species indicators include color, light reflectance, body weight and image recognition.

Another embodiment of the disclosure generally comprises a housing having an access opening therein for permitting access to bird feed in an interior of the housing by a bird. A door is mounted to the housing and is positionable in a closed condition closing the access opening or in an open condition exposing the bird feed to the bird. A drive mechanism is mounted to the housing and is mechanically coupled to the door. The drive mechanism is actuated to move the door to the closed condition or to the open condition. An actuator is mounted on the housing and is operationally coupled to the drive mechanism. A sensor is mounted to the housing and is operationally coupled to the actuator. The sensor is configured to radiate energy to a position outside of the housing and adjacent to the opening. The sensor receives reflected radiation reflected off of an object adjacent to the opening. A control circuit is operationally coupled to the sensor and the control circuit is programmed to assign an input value to the reflected radiation. The control circuit is programmed to compare the input value with at least one standard value. The actuator actuates the drive mechanism to move the door to the closed condition when the input value is outside a threshold limit of the standard value and the actuator actuates the drive mechanism to move the door to the open condition when the input value is within the threshold limit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
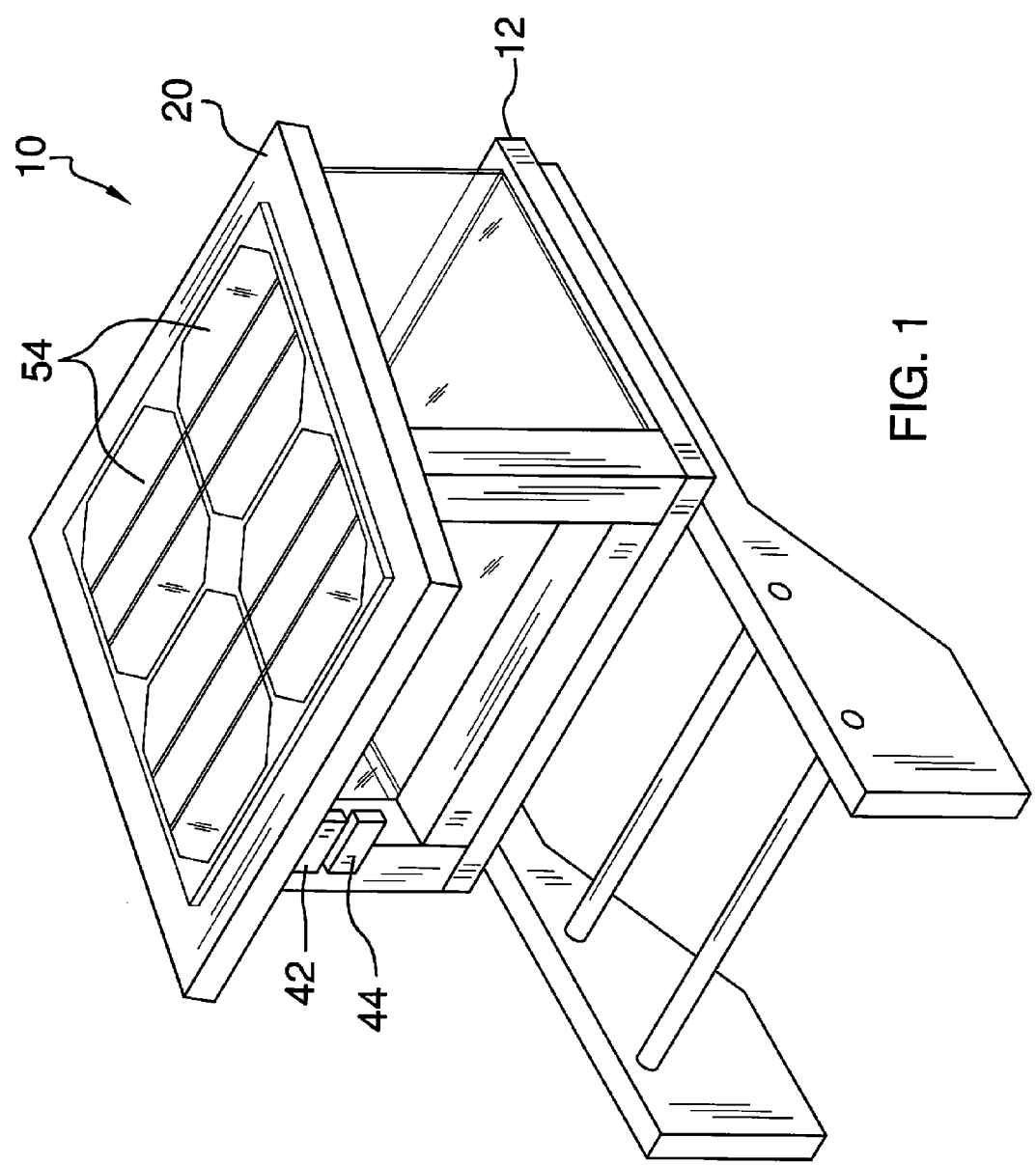
FIG. 1 is a front perspective view of a selective bird feeding apparatus according to an embodiment of the disclosure.
Figure 2:
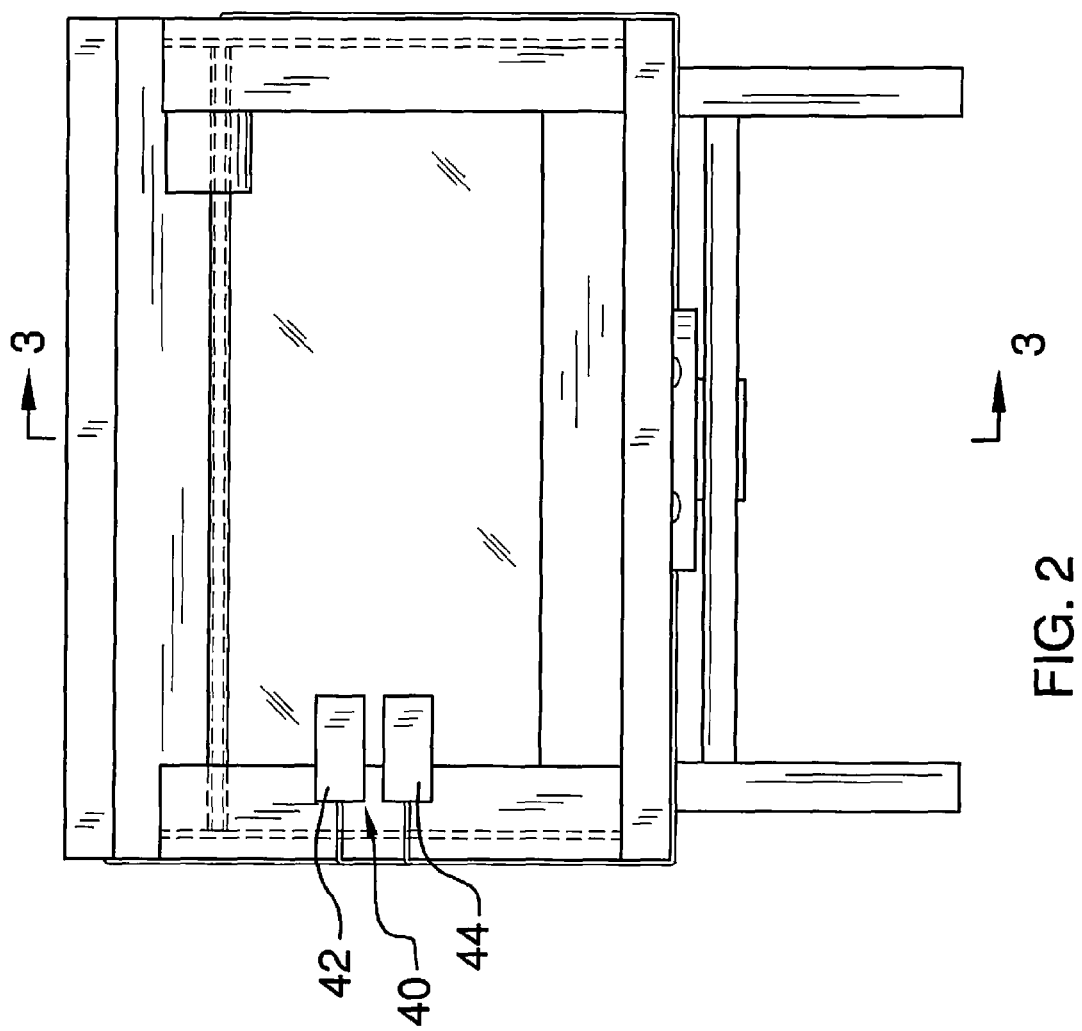
FIG. 2 is a front view of an embodiment of the disclosure.
Figure 3:
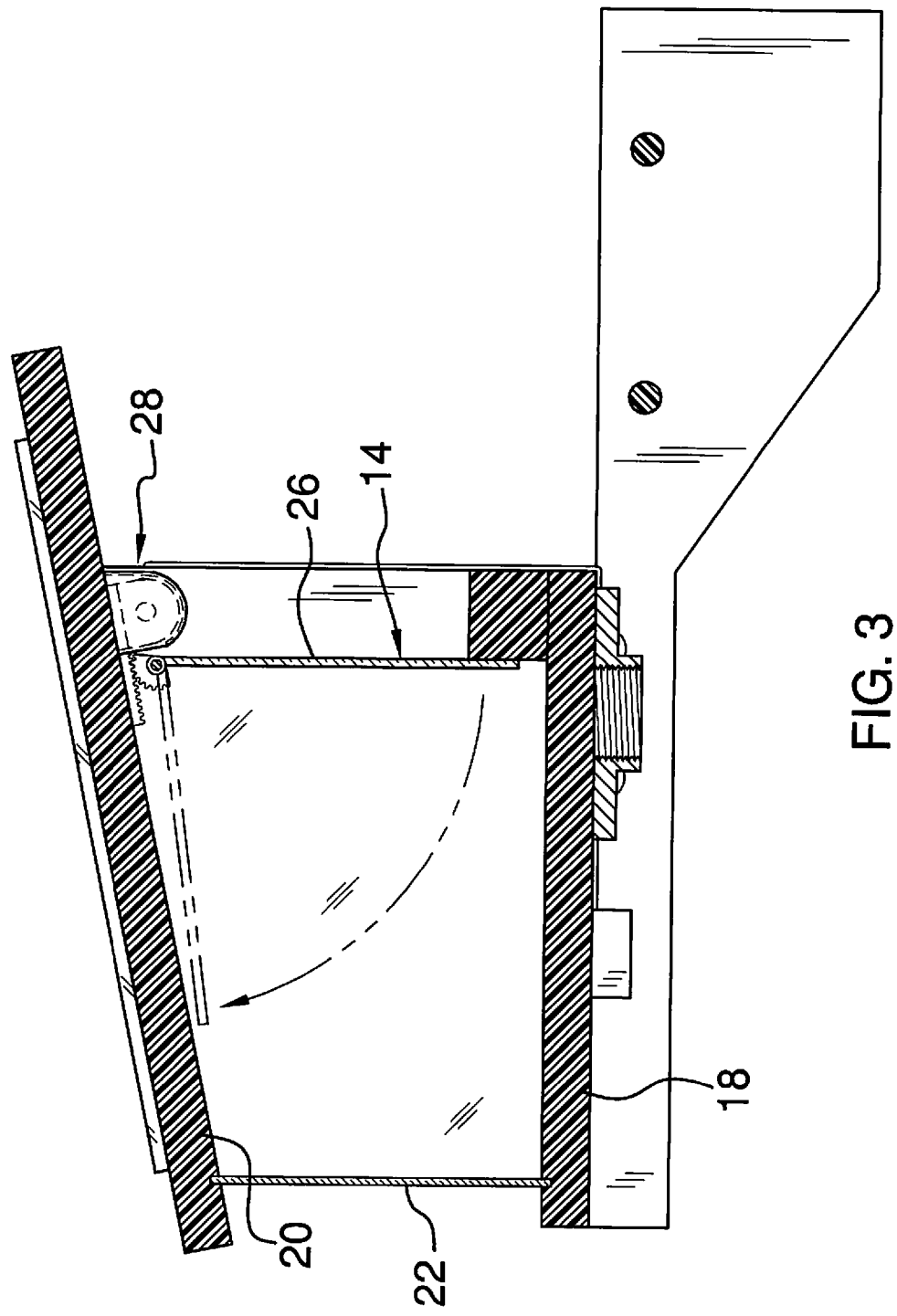
FIG. 3 is a cross-sectional view of an embodiment of the disclosure taken along line 3-3 of FIG. 2.
Figure 4:
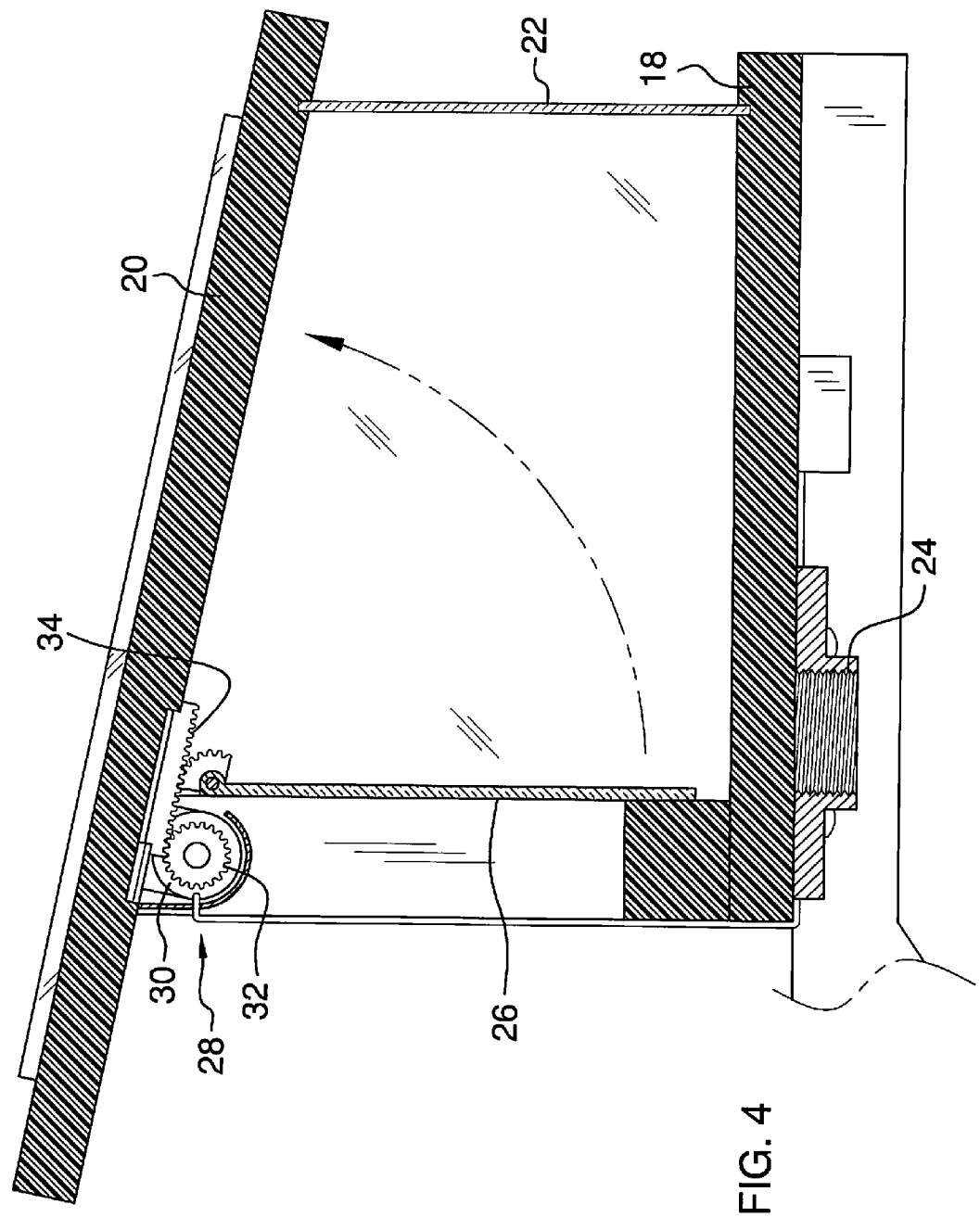
FIG. 4 is a cross-sectional view of an embodiment of the disclosure.
Figure 5:
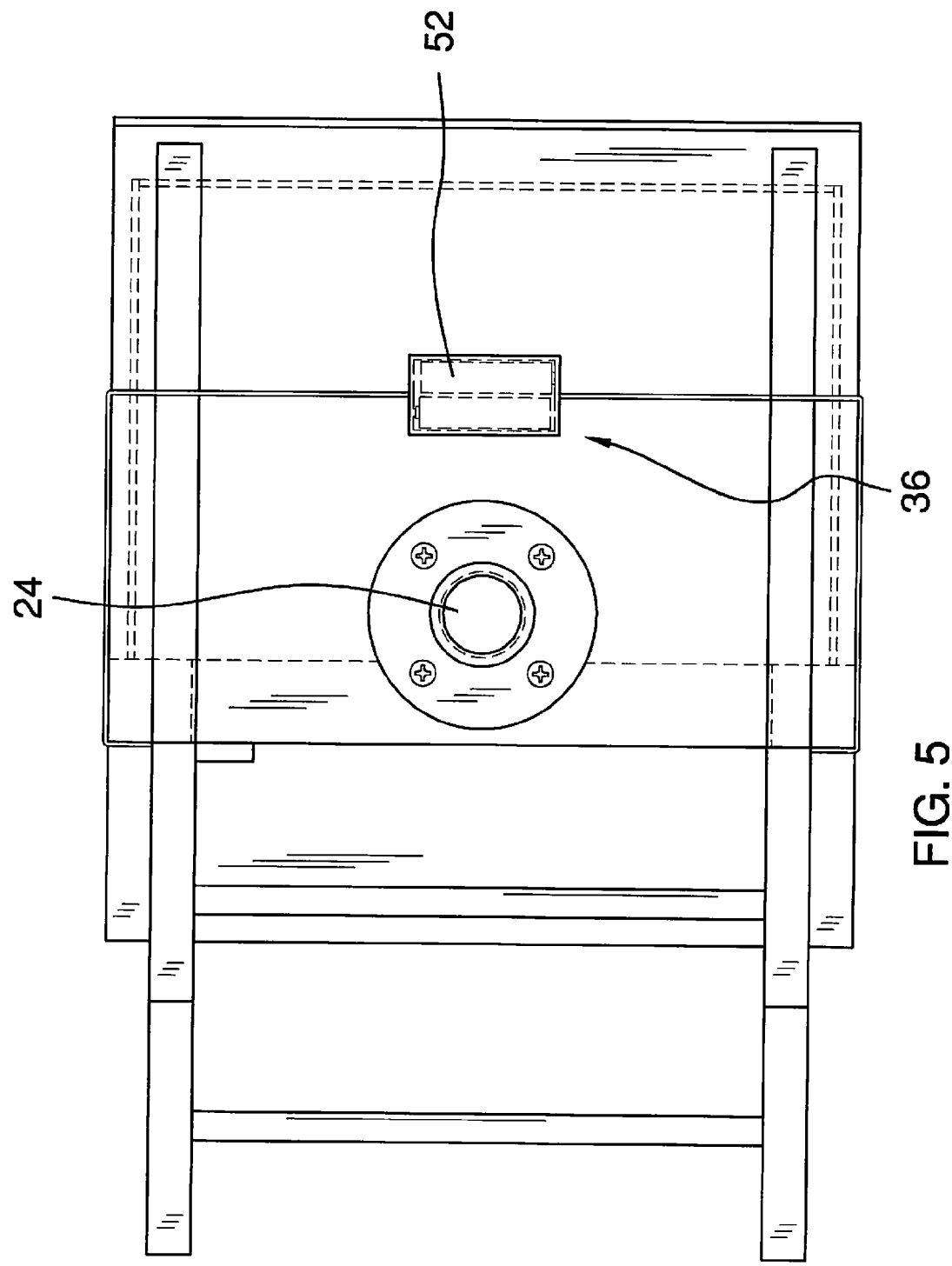
FIG. 5 is a bottom view of an embodiment of the disclosure.
Figure 6:
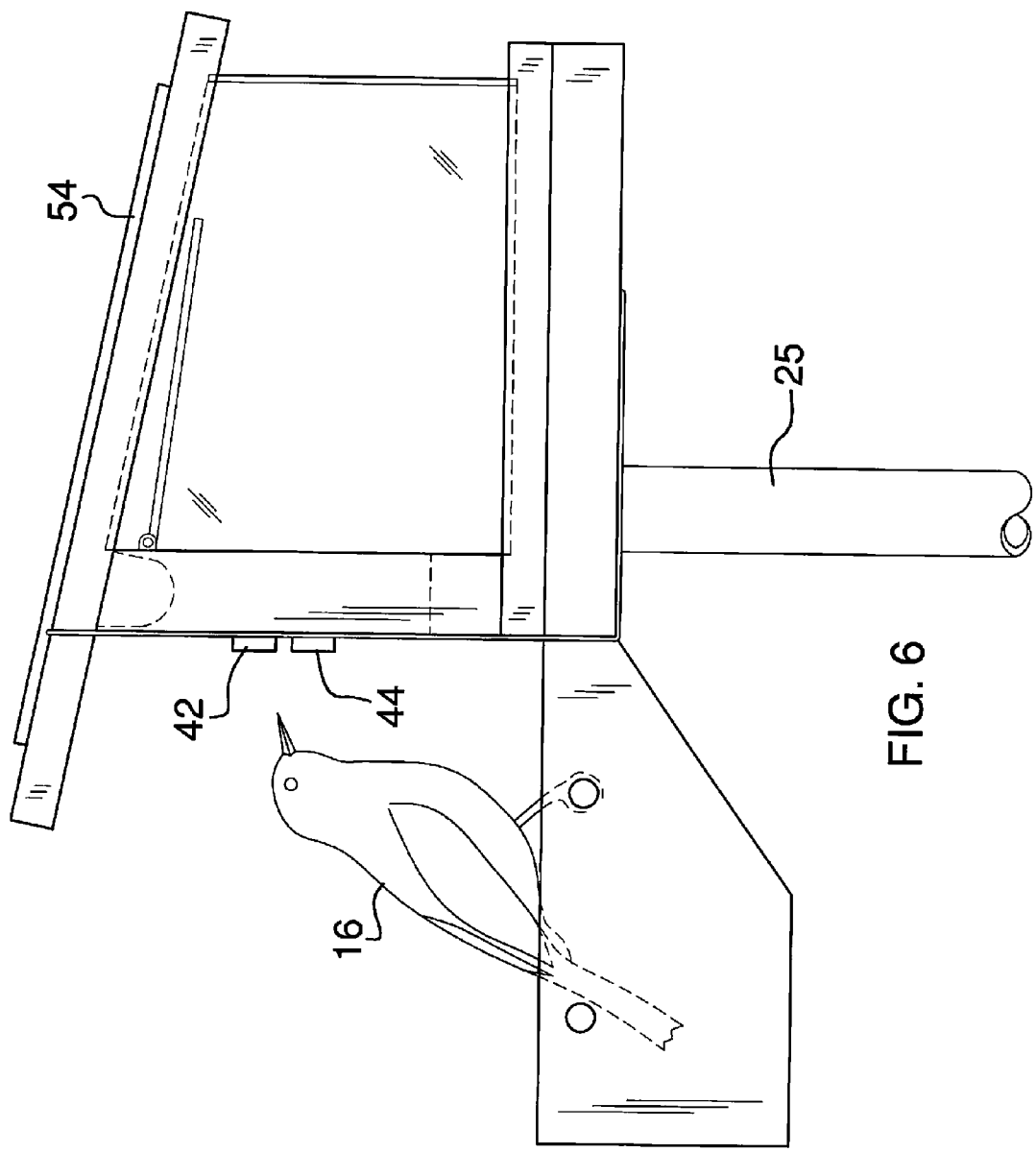
FIG. 6 is a side in-use view of an embodiment of the disclosure.
Figure 7:
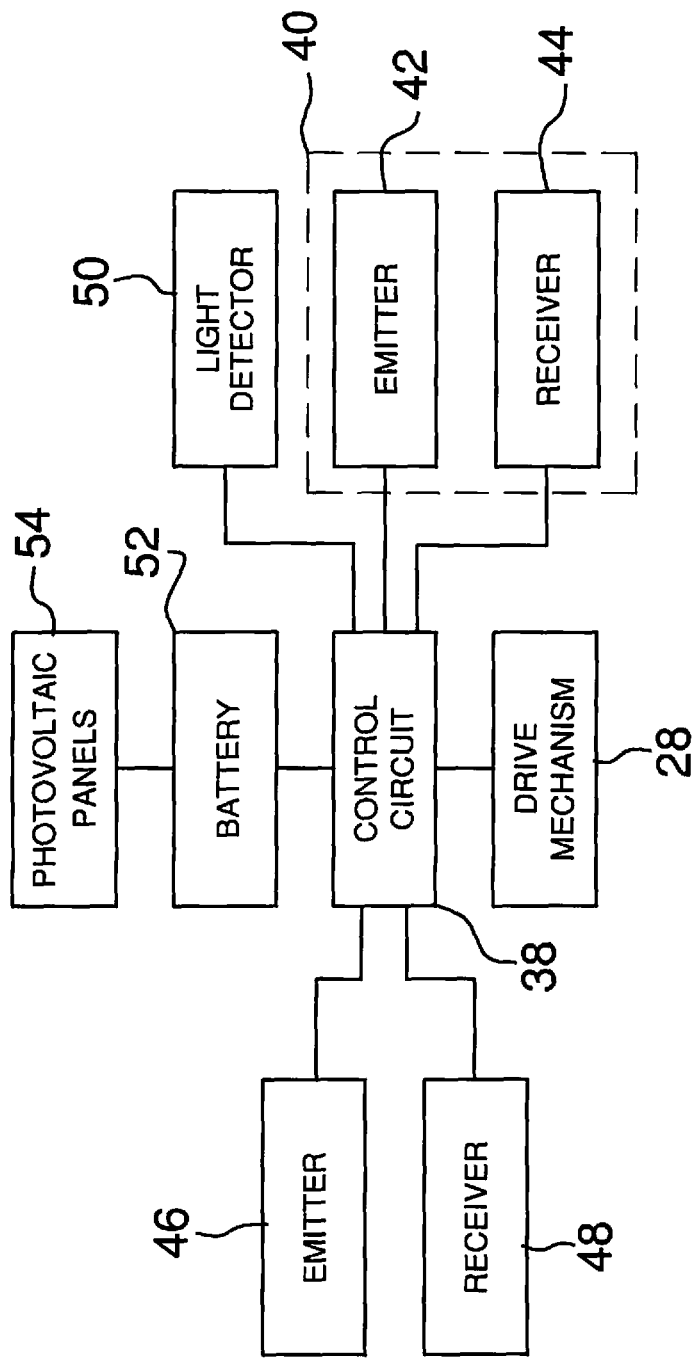
FIG. 7 is a schematic view of an embodiment of the disclosure.

With reference now to the drawings, and in particular to FIGS. 1 through 7 thereof, a new electronic bird feeding device embodying the principles and concepts of an embodiment of the disclosure and generally designated by the reference numeral 10 will be described.

As best illustrated in FIGS. 1 through 7, the selective bird feeding apparatus 10 generally comprises a housing 12 having an access opening 14 therein for permitting access to bird feed, not shown, in an interior of the housing 12 by a bird 16. The housing 12 may take any number of conventional configurations and may generally include a bottom wall 18, a top wall 20 and a perimeter wall 22 attached to and extending between the top 20 and bottom 18 walls. The opening 14 may be positioned in the perimeter wall 22 and may have any desired size and may be large enough to allow a bird 16 to enter the housing 12 or may be small enough to only allow the head or beak to enter the opening 14 and access the bird feed. The housing 12 itself may have a polygonal, spherical, cylindrical, conical or other shape. Alternatively, the housing 12 may have a missing top wall which forms the opening 14. The housing 12 may be mounted in any manner conventional to bird feeders and may include, for instance, a mount 24 attached to the housing 12 for engaging a post 25 to support the housing 12 over a ground surface.

A door 26 is mounted to the housing 12 and is positionable in a closed condition closing the access opening 14 or in an open condition exposing the bird feed to the bird 16. The door 26 will have a size and shape depending on the size and shape of the opening 14. The door 26 may comprise a pivoting door which pivots between the open and closed positions as generally shown in the Figures. Alternatively, the door 26 may be mounted to the housing 12 in a sliding manner to allow the door 26 to slide relative to the housing. Other conventional door structures as found in bird feeders may be utilized. Moreover, should the housing 12 have no top wall as described above, the door 26 may function as a cover.

A drive mechanism 28 is mounted to the housing 12 and is mechanically coupled to the door 26. The drive mechanism 28 is actuated to move the door 26 to the closed condition or to the open condition. Generally, the drive mechanism 28 includes a motor 30, such as an electric motor, which is mechanically coupled to the door 26. More particularly, the Figures depict at least one typical drive mechanism construction utilizing a gear 32 mounted to the motor 30 which engages a track 34 which in turn engages the door 26. As the motor 30 rotates the gear 32 in a first direction, the track 34 is moved outwardly of the house 12 and pulls the door 26 open. When the gear 32 is rotated in a second direction, the track 34 is moved inwardly of the house 12 and moves the door 26 to the closed position. It may be easily envisioned that the motor 30 may be directly coupled to the door 26 and that multiple various and conventional coupling means would be contemplated by those knowledgeable in the art of door opening devices. Alternate drive mechanism means aside from a motor 30 may be used. For instance, a solenoid may be utilized which includes a rod coupled to the door. Also, instead of interlocking gears, a belt mechanism may be used and further a structure may be utilized wherein the motor only drives a gear or belt in a single direction but which cycles the door through the open and closed positions. Thus, any conventional means for opening and closing the door may be utilized.

An actuator 36 is mounted on the housing 12 and is operationally coupled to the drive mechanism 28. The actuator 36 actuates the drive mechanism 28 to move the door 26 to the closed position or the open position. The actuator 36 may include a control circuit 38, such as a processor, being programmed to selectively open or close the door 26 based upon pre-determined inputs as more fully described below. A sensor 40 is mounted to the housing 12 and is operationally coupled to the actuator 36. The sensor 40 measures an area outside of the housing 12 and adjacent to the opening 14. The sensor 40 is configured to electronically determine when an undesirable bird species is adjacent to the opening 14. The actuator 36 then actuates the door 26 to the closed condition when an undesirable bird species is detected by the sensor 40. The sensor 40 is configured to detect one or more species indicators. The species indicators may include, for example, color of the bird, light reflectance of the bird, body weight and image recognition. Depending on the types of birds being excluded from the housing 12 only one of the species indicators might be used though it may be useful to utilize at least two of the species indicators.

In one embodiment of the apparatus 10, the sensor 40 radiates energy to the position outside of the housing 12 and adjacent to the opening 14 and then the sensor 40 receives reflected radiation which is reflected off of an object adjacent to the opening 14. Thus, the sensor 40 will include an emitter 42 and a receiver 44. The reflected energy may be either mechanical energy, such as sound, or electromagnetic energy such as light. The control circuit 38 is programmed to assign an input value to the reflected radiation and to compare the input value with at least one stored standard value. The actuator 36 actuates the drive mechanism 28 to move the door 26 to the closed condition when the input value is outside a threshold limit of the standard value and the actuator 36 actuates the drive mechanism 28 to move the door to the open condition when the input value is within the threshold limit. Generally, when there is no bird, the input value will be within the threshold limit so that the door 26 is retained in an open condition until an undesirable species of bird is detected.

As stated above, the reflected energy may include light which may comprise visible light, infrared light, ultraviolet light or combinations thereof. In an example of the sensor 40 detecting light reflectance, the sensor 40 may include a light emitter 42 directed where the bird 16 will be perched or standing. The light emitter 42 illuminates the bird 16 with the light and the receiver 44 detects the amount of light being reflected off of the bird 16. The control circuit 38 will be programmed to determine if the input value, which is the detected amount of reflected light, is above or below a stored standard value. If the input value is below the standard value, the control circuit 38 will actuate the drive mechanism 28 to move the door to the closed position. Generally, darker colored birds such as blackbirds are considered less desirable for bird feeding purposes while brighter colored birds are considered more desirable. The standard value may be determined by detecting the amount of light being reflected by darker birds and the amount of light reflected by brighter birds. The standard value will generally be selected at an amount between the low reflectance value and the high reflectance value to prevent errors whereby excluded birds are allowed access to bird feed in the housing 12. In this example, to improve the accuracy of the sensor, a secondary light emitter 46 and secondary receiver 48 may be provided which are directed at a black, or substantially dark, surface on or adjacent to the housing 12. The black surface is also illuminated by ambient light to provide a reference value that will include sunlight when determining the reference value. The control circuit 38 will compare a first value, reflected from the bird, to a second value, reflected from the black surface to create ratio which is then compared to a standard value. For instance, the second value may have a value of 20 whereas the first value is equal to 70 when measuring a cardinal and 30 when measuring a blackbird. The first value is divided by the second value so that the input value of the cardinal is 3.5 while that of the blackbird is 1.5. The standard value may be, for example, 2.0 so that any input value less than 2.0, which would be considered low light reflectance, causes the actuator to close the door 26. When no bird 16 is struck by the light emitter 42, the receiver 44 will only be detecting ambient light have a large value which will be greater than the standard value to retain the door 26 in the open position. It should be understood that all valuations may be subjective programmable units which may have any assignable value by a programmer and the values cited herein are for example only.

In another example, the sensor 40 may be used to detect coloration of the bird. This may be accomplished, for instance, by using a light emitter 42 emitting a light along a wide range of wavelengths. The receiver 44 may comprise a conventional RBG (red/blue/green) detector measuring each of the red, blue and green light components of the light reflected off of the bird 16. This may be achieved also by a charge-coupled device (CCD) such as those used in cameras which send signals to a control circuit programmed to provide a color histogram. The control circuit 38 will determine which is the dominant color signature presented and compare that with known values for various birds and thereby provide likely species being detected. If the color signature is unacceptable, the door 26 will be closed. In this and other examples, it should be understood that the sensor 40 may not include an emitter but instead only include the receiver 44 detecting sunlight reflecting off of the bird.

In yet another example, the sensor 40 may comprise a camera for capturing an image of the bird. This image is then compared against a plurality of stored reference images by conventional image recognition software. If the image captured matches that of a preferred species, then the door 26 is retained in an open position. If the image captured matches that of an unapproved species, the door 26 is closed. It should be understood that the control circuit 38 may be programmed to only find matches for approved species or matches for unapproved species as opposed to searching for both.

The sensor 40 may also be configured to determine the body weight of the bird adjacent to the opening. The control circuit 38 is programmed to compare the value of the sensor 40 against stored values of maximum weight limits. If the bird, or other animal such as a squirrel, is determined be above the maximum weight limit, the door 26 is closed. The sensor 40 may comprise the emitter 42 being one which emits sound while the receiver 44 is a sound detector for detecting the amount of sound being reflected off of the bird. The reflected sound is then assigned a value and compared against the stored value. The magnitude of reflected sound, which is associated with the volume of the object being struck, is correlated with a body weight or more generically the size of the bird, and in this way the sensor 40 and control circuit 38 are used to determine if the bird is likely larger than desired species of birds. This may or may not further be used to calculate an approximate weight of the bird. Typically larger birds such as black birds and blue jays are considered undesirable species for bird feeders and determining the approximate weight/size of the bird will be useful in preventing these birds from accessing the bird feed. The maximum weight limit may be approximately 50 grams.

As stated above, the sensor 40 may utilize multiple species indicators and therefore multiple sensors 40. In particular, it may be beneficial to combine a sensor detecting weight with a sensor configured to detect either color or light reflectance. The weight detecting sensor may include lower and middle weight limits in addition to the maximum weight limit. If the weight is determined to be below the lower weight limit the door 26 is retained in the open position. If the weight is greater than the maximum weight limit the door is closed. In each of these cases, the coloration or reflectance of the bird may not be used. However, if the weight is within the middle weight limit, the color or light reflectance is also used. If the coloration or reflectance is determined to be too dark, the door 26 is closed but if the coloration is acceptable, the door 26 is retained in the opening position. While it should be understood that the weights may be altered depending on the requirements of the user of the bird feeding apparatus 10, the middle weight limit may be generally between 20 grams and 50 grams but it should be understood that the middle weight limit may be varied such that its upper end is as low as 35 grams. The maximum weight limit may be greater than at least 50 grams but again may be as low as 35 grams. The variance in the maximum weight/middle weight delineation point is primarily a factor of considering the types of birds in the area as well as the size of juvenile bird. The lower weight limit may generally be less than 20 grams.

The apparatus 10 may further include an ambient light detector 50 operationally coupled to the actuator 36 which again may include the control circuit 38. The ambient light detector 50 detects an amount of ambient light striking an outer surface of the housing 12. The actuator 36 actuates the drive mechanism to close the door 26 when the ambient light detector 50 detects a minimal amount of light and actuates the door 26 to the open position when the ambient light detector detects an amount of light greater than the minimal amount of light. The minimal amount of light may be less than about 5.0 lux. The ambient light detector 50 ensures that the door is closed during periods of darkness. Alternatively, the control circuit 38 may be programmed with the date, time and times for sunset and sunrise such that the control circuit 38 opens the door 26 at sunrise and closes it at sunset. Simpler timer mechanisms may also be employed for keeping the door 26 open or closed for a selected amount of time.

The apparatus 10 may be powered by one or more batteries 52 and more particularly rechargeable batteries which are electrically coupled to the control circuit 38 and drive mechanism 28. Photovoltaic panels 54 may be mounted on the housing and electrically coupled to the batteries to recharge the batteries.

While the usage of a door 26 has been described above, other food delivery systems may be employed. Thus, a screw drive could be used to move food outwardly from a storage compartment to a position exterior of the housing 12 where it may be accessed by the bird. Such a design would prevent a bird from timing the apparatus 10 such that it uses its body to prevent the door 26 from closing. Other delivery systems such as conveyors or gravity wheel mechanisms could also be utilized to delivery the bird feed to a trough for access by the bird. These systems would be actuated in the same manner as the door and only driven when a preferred species is detected.

In use, the bird feeding apparatus 10 is used in a typical manner of bird feeders and houses bird feed in a manner that allows birds standing on or perched adjacent to the housing 12 to access the bird feed held within the housing 12. However, the apparatus 10 utilizes its sensor 40 to only feed selected species of birds. Persons who feed birds often desire to attract smaller, highly colorful birds which can require expensive and specialized bird feed. Other birds, such as blackbirds, blue jays and the like are well known to not only dominate such bird feed stores but also tend to disperse much of the bird feed onto the ground below the housing thus wasting feed and driving away other birds. The actuator 36 prevents this by closing the door 26 when these undesirable species attempt to access the bird feed. Generally the door 26, it may be preferred that the door is retained in an open state unless it has been actuated to the closed state. This is done to prevent the frightening away of desirable species which would be caused by the door 26 moving from the closed position to the open position only when a desired species is detected. However, if the door 26 is sufficiently quiet during its movement, along with the motor and attachments therefore, the apparatus 10 may be configured opposite such that it opens when a desired species is detected and remains closed until a desired species is detected or remains open until an undesired species is detected. The apparatus 10 further includes structures, as described above, to move the door to the closed position during times when feeding is not required, such as at night.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bird feeding assembly configured for selectively feeding birds, said assembly including:
   a housing having an access opening therein for permitting access to bird feed in an interior of said housing by a bird;
   a door being mounted to said housing, said door being positionable in a closed condition closing said access opening or in an open condition exposing the bird feed to the bird;
   a drive mechanism being mounted to said housing and being mechanically coupled to said door, said drive mechanism being actuated to move said door to said closed condition or to said open condition;
   an actuator being mounted on said housing and being operationally coupled to said drive mechanism;
   a sensor being mounted to said housing and being operationally coupled to said actuator, said sensor measuring an area outside of said housing and adjacent to said opening, said sensor being configured to electronically determine when an undesirable bird species is adjacent to said opening, said actuator actuating said door to said closed condition when an undesirable bird species is detected by said sensor, said sensor detecting one or more species indicators, said species indicators including color, light reflectance, body weight or image recognition.

2. The bird feeding assembly according to claim 1, wherein said actuator actuates said drive mechanism to close said door when said sensor detects an unacceptable color of an object adjacent to said opening.

3. The bird feeding assembly according to claim 1, wherein said actuator actuates said drive mechanism to close said door when said sensor detects an object adjacent to said opening having a low light reflectance.

4. The bird feeding assembly according to claim 1, wherein said image recognition includes a plurality of reference images, wherein said sensor receives a captured image of a bird adjacent to said opening for comparison with said reference images, said actuator actuating said drive mechanism to close said door when captured image does not match one of said reference images.

5. The bird feeding assembly according to claim 1, wherein said body weight includes a maximum weight limit, said actuator actuating said drive mechanism to close said door when a bird adjacent to said opening weighs more than said maximum weight limit.

6. The bird feeding assembly according to claim 5, wherein said maximum weight limit is at least greater than 50 grams.

7. The bird feeding assembly according to claim 5, wherein:
   said sensor at least detects said body weight and said color, said body weight including a lower weight limit, a middle weight limit and said maximum weight limit, said middle weight limit comprising a range of weights between said lower and maximum weight limits;
   said door being retained in an open condition if said sensor detects said body weight being within said lower weight limit;
   said door being closed if said sensor detects said body weight being greater than said maximum weight limit; and
   said door being closed if said sensor detects said body weight being within said middle weight limit and said color is an unacceptable color.

8. The bird feeding assembly according to claim 7, wherein said middle weight limit is between 20 grams and 50 grams, said maximum weight limit is greater than at least 50 grams and said lower weight limit is less than 20 grams.

9. The bird feeding assembly according to claim 5, wherein:
   said sensor at least includes said body weight and said light reflectance, said body weight including a lower weight limit, a middle weight limit and said maximum weight limit, said middle weight limit comprising a range of weights between said lower and maximum weight limits;
   said door being retained in an open condition if said sensor detects said body weight being within said lower weight limit;
   said door being closed if said sensor detects said body weight being greater than said maximum weight limit; and
   said door being closed if said sensor detects said body weight measurement being within said middle weight limit and said light reflectance is low.

10. The bird feeding assembly according to claim 9, wherein said maximum weight limit including at least weights greater than 50 grams and said lower weight limit is less than 20 grams.

11. The bird feeding assembly according to claim 1, further including an ambient light detector operationally coupled to said actuator, said ambient light detector detecting an amount of ambient light striking an outer surface of said housing, said actuator actuating said drive mechanism to close said door when said ambient light detector detects a minimal amount of light, said actuator actuating said door to said open position when said ambient light detector detects an amount of light greater than said minimal amount of light.

12. The bird feeding assembly according to claim 11, wherein said minimal amount of light is less than 5.0 lux.

13. The bird feeding assembly according to claim 1, further including an ambient light detector operationally coupled to said actuator, said ambient light detector detecting an amount of ambient light striking an outer surface of said housing, said actuator actuating said drive mechanism to close said door when said ambient light detector detects a minimal amount of light, said actuator actuating said door to said open position when said ambient light detector detects an amount of light greater than said minimal amount of light.

14. The bird feeding assembly according to claim 13, wherein said minimal amount of light is less than 5.0 lux.

15. A bird feeding assembly configured for selectively feeding birds, said assembly including:
   a housing having an access opening therein for permitting access to bird feed in an interior of said housing by a bird;
   a door being mounted to said housing, said door being positionable in a closed condition closing said access opening or in an open condition exposing the bird feed to the bird;
   a drive mechanism being mounted to said housing and being mechanically coupled to said door, said drive mechanism being actuated to move said door to said closed condition or to said open condition;
   an actuator being mounted on said housing and being operationally coupled to said drive mechanism;
   a sensor being mounted to said housing and being operationally coupled to said actuator, said sensor being configured to radiate energy to a position outside of said housing and adjacent to said opening, said sensor receiving reflected radiation reflected off of an object adjacent to said opening;

a control circuit being operationally coupled to said sensor, said control circuit being programmed to assign an input value to said reflected radiation;

said control circuit being programmed to compare said input value with at least one standard value, said actuator actuating said drive mechanism to move said door to said closed condition when said input value is outside a threshold limit of said standard value, said actuator actuating said drive mechanism to move said door to said open condition when said input value is within said threshold limit.

16. The bird feeding assembly according to claim 15, wherein said reflected radiation is light radiation and said input value comprises a color determination of said reflected radiation.

17. The bird feeding assembly according to claim 15, wherein said reflected radiation is light radiation and said input value comprising a light reflectance value of said reflected radiation.

18. The bird feeding assembly according to claim 15, wherein said energy comprises electromagnetic energy.

19. The bird feeding assembly according to claim 15, wherein said energy comprises visible light.

20. The bird feeding assembly according to claim 15, wherein said energy comprises sound waves.

21. A method of selectively providing bird feed to a bird comprising the steps of:
providing a housing having bird feed therein;
providing a receiver mounted on said housing;
detecting reflected energy reflected off of a bird with said receiver;
analyzing said reflected energy; and
allowing access to at least a portion of the bird feed to the bird if the reflected energy is within a predetermined set of parameters and restricting the bird feed to the bird if the reflected energy is outside of said predetermined set of parameters.

22. The method of selectively providing bird feed to a bird according to claim 21, wherein said method further includes the steps of:
providing an emitter mounted on said housing;
emitting energy from said emitter and striking a bird with the energy, wherein the energy reflected off of the bird defined said reflected energy.

23. The method of selectively providing bird feed to a bird according to claim 21, wherein the step of providing said housing further includes said having an access opening therein for permitting access to said bird feed in an interior of said housing by the bird, a door being mounted to said housing, said door being positionable in a closed condition closing said access or in an open condition exposing the bird feed to the bird, a drive mechanism being mounted to said housing and being mechanically coupled to said door, said drive mechanism being actuated to move said door to said closed condition or to said open condition, an actuator being mounted on said housing and being operationally coupled to said drive mechanism, said receiver being operationally coupled to said actuator, said actuator actuating said door to said closed condition or retaining said door in said closed condition when an undesirable bird species is detected by said receiver.

24. The method of selectively providing bird feed to a bird according to claim 23, wherein the step of providing said receiver includes said receiver detecting one or more species indicators, said species indicators including color, light reflectance, body weight or image recognition.

25. The method of selectively providing bird feed to a bird according to claim 23, further including the step of providing an ambient light detector operationally coupled to said actuator, said ambient light detector detecting an amount of ambient light striking an outer surface of said housing, said actuator actuating said drive mechanism to close said door when said ambient light detector detects a minimal amount of light, said actuator actuating said door to said open position when said ambient light detector detects an amount of light greater than said minimal amount of light.

26. The method of selectively providing bird feed to a bird according to claim 21, further including the steps of:
providing an ambient light detector operationally; and
preventing access to said bird feed when said ambient light detector detects a minimal amount of light.

* * * * *